UNITED STATES PATENT OFFICE.

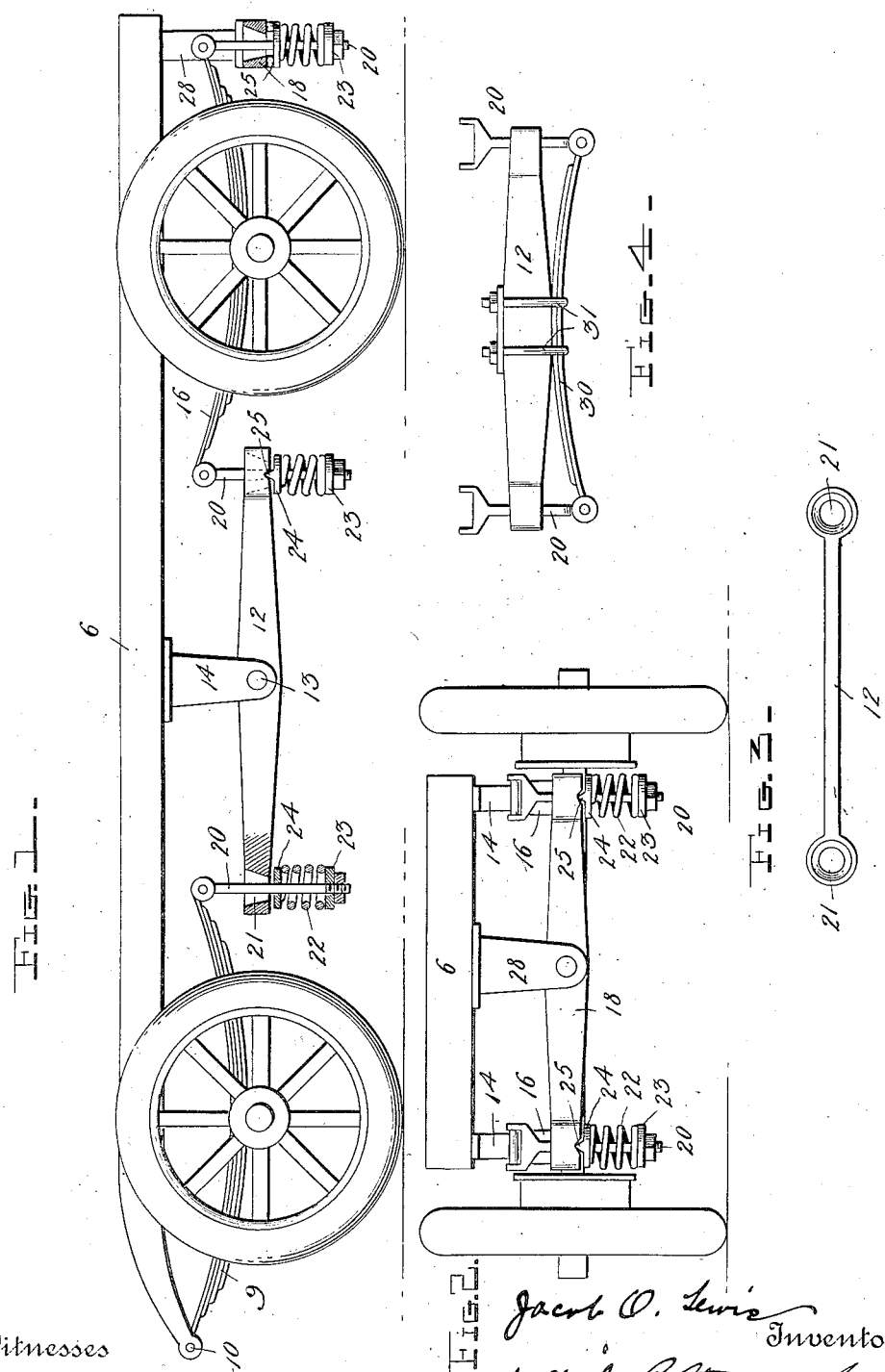

JACOB O. LEWIS, OF CHICAGO, ILLINOIS.

VEHICLE-SPRING.

No. 865,505.    Specification of Letters Patent.    Patented Sept. 10, 1907.

Application filed December 18, 1906. Serial No. 348,428.

*To all whom it may concern:*

Be it known that I, JACOB O. LEWIS, a citizen of the United States, residing at Chicago, in the county of Cook and State of Illinois, have invented certain new and useful Improvements in Vehicle-Springs, of which the following is a specification.

This invention relates to vehicle springs or spring gear, and it is particularly useful in connection with automobiles, and is an improvement on, or addition to, the invention shown and claimed in my pending application, Serial Number 348,429. In said application there is disclosed and claimed front and rear longitudinal springs carried on the front and rear axles, respectively, and connected at their outer ends to the frame of the vehicle, and connected at their inner ends to an equalizing lever which is mounted on the vehicle frame and which transmits shocks or strain from one spring to the other. The present invention embodies the same feature, with the addition of other features, as more fully hereinafter described.

In the accompanying drawings, Figure 1 is a side elevation of a vehicle running gear provided with the present improvement. Fig. 2 is a rear elevation thereof. Fig. 3 is a top plan view of the equalizing lever. Fig. 4 is an elevation showing a modified form of spring used in connection with the lever.

As in the invention shown and claimed in said former application, the present construction includes front and rear longitudinal semi-elliptic springs 9 and 16, the former of which is connected at its front end, as at 10, to the front end of the side bar of the chassis 6 and the latter of which is connected to a rear or cross equalizing lever 18. The equalizing lever at each side is indicated at 12, pivoted at 13 to a bracket 14 depending from the frame.

Instead of the simple shackle connection between the springs and the lever, as shown in the former application, the connection is formed, in the present invention, by means of rods 20. Each rod is connected to the adjacent end of the spring and depends through a tapered or flared hole 21 in the end of the lever 12, and below the lever has a coiled spring 22 held between a nut and washer 23 on the lower end of the rod and a washer 24 between the top of the coiled spring and the end of the lever. The holes 21 are flared to allow a limited amount of lateral vibration or swing of the rod, to accommodate the movement incident to the lengthening of the main spring when it is compressed, and for the same reason the washer 24 is mounted to rock slightly upon V-lugs 25 which are set in notches in the under side of the lever. At the rear, the connection between the rear ends of the opposite rear springs is formed in the same manner, the lever 18 being pivoted to a depending bracket 28 at the middle of the frame.

As a modification, instead of the coiled springs 22, the rods 20 may be connected to the ends of a semi-elliptic spring 30 attached by clips 31 to the under side of the lever 12 or 18. This acts substantially in the same manner as with the coiled spring.

The purpose of introducing the coiled or supplementary springs between the levers and the connecting rods to the main springs is to make the spring gear more elastic and sensitive. The said supplementary springs will absorb all ordinary shocks without transmitting the same from one of the main springs to the other, but heavier shocks which cannot be entirely absorbed by the said supplementary springs will be transferred through the equalizing levers from one of the main springs to the other, in the manner described in my former application. Said distribution or transfer of the shock will take place or be conducted around all the springs on both sides of the frame, by means of the longitudinal and cross equalizing levers.

The construction shown will make a very flexible, smooth, and easy riding spring gear, which will prevent the disagreeable bouncing or jolting incident to fast traveling, or traveling over rough roads, and will relieve any particular spring or wheel of a large amount of the strain or shock imparted thereto, by distributing or transferring said shock among practically all the springs of the gear.

I claim:

1. In a vehicle, the combination of springs carried on the front and rear axles of the vehicle, a lever connected between its ends to the vehicle body, and spring connections between the ends of the lever and the front and rear springs respectively.

2. In a vehicle, the combination of longitudinal springs carried on the front and rear axles at each side of the vehicle body, the springs being connected at their outer ends to the vehicle body, a lever fulcrumed on the vehicle body on each side thereof, and spring connections between the ends of the lever and the inner ends of the springs.

3. In a vehicle, the combination of longitudinal springs carried on the front and rear axles at each side of the vehicle body, the springs being connected at their outer ends to the vehicle body, a lever fulcrumed on the vehicle body on each side thereof, said lever having openings through the ends, rods connected to the inner ends of the springs and extending through said openings, and springs between the rods and the lever.

4. In a vehicle, the combination of separate springs mounted upon the running gear, a lever fulcrumed on the vehicle body and supporting the same, said lever having openings through its ends, rods depending from the ends of the springs, through the holes, and coiled springs supported by the rods and bearing under the ends of the lever.

In testimony whereof I affix my signature, in presence of two witnesses.

JACOB O. LEWIS.

Witnesses:
 NELLIE FELTSKOG,
 H. G. BATCHELOR.